Sept. 12, 1967  R. W. WHEELER ET AL  3,341,313
METHOD AND APPARATUS FOR BENDING AND TEMPERING GLASS SHEETS
VERTICALLY SUPPORTED WITH FLUID PRESSURE
Filed Oct. 21, 1963

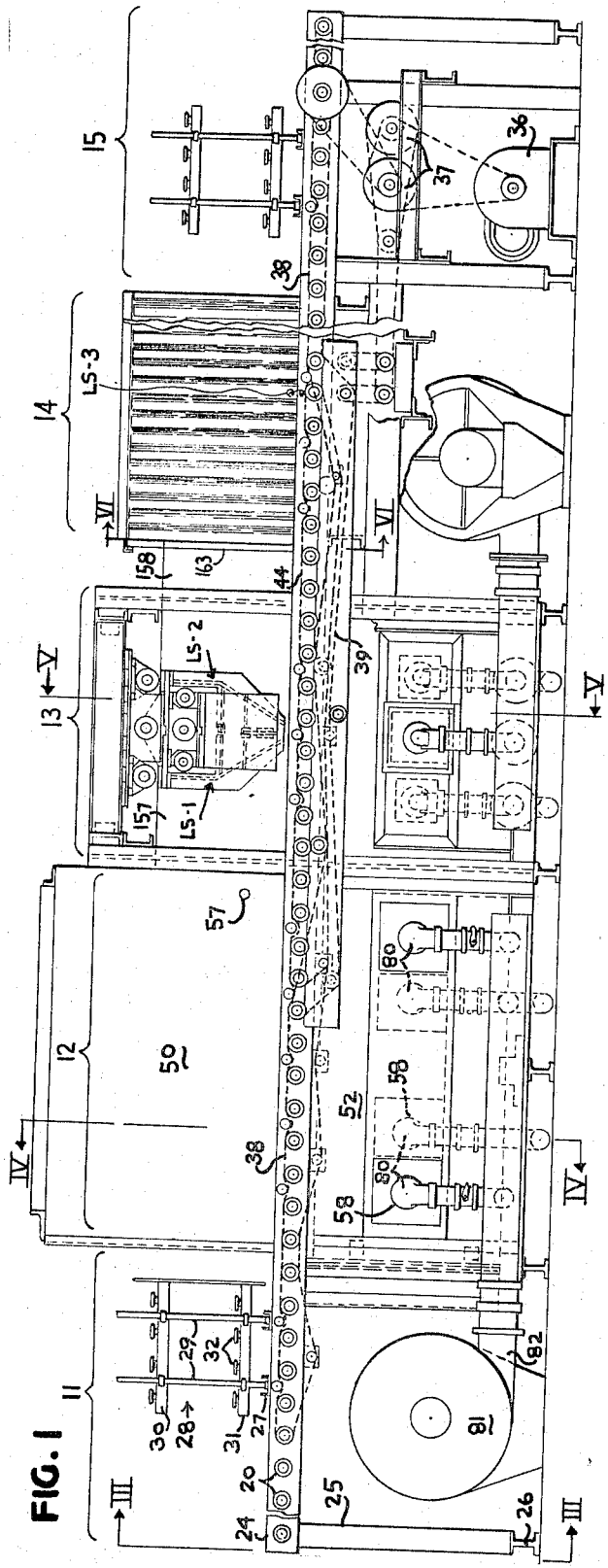

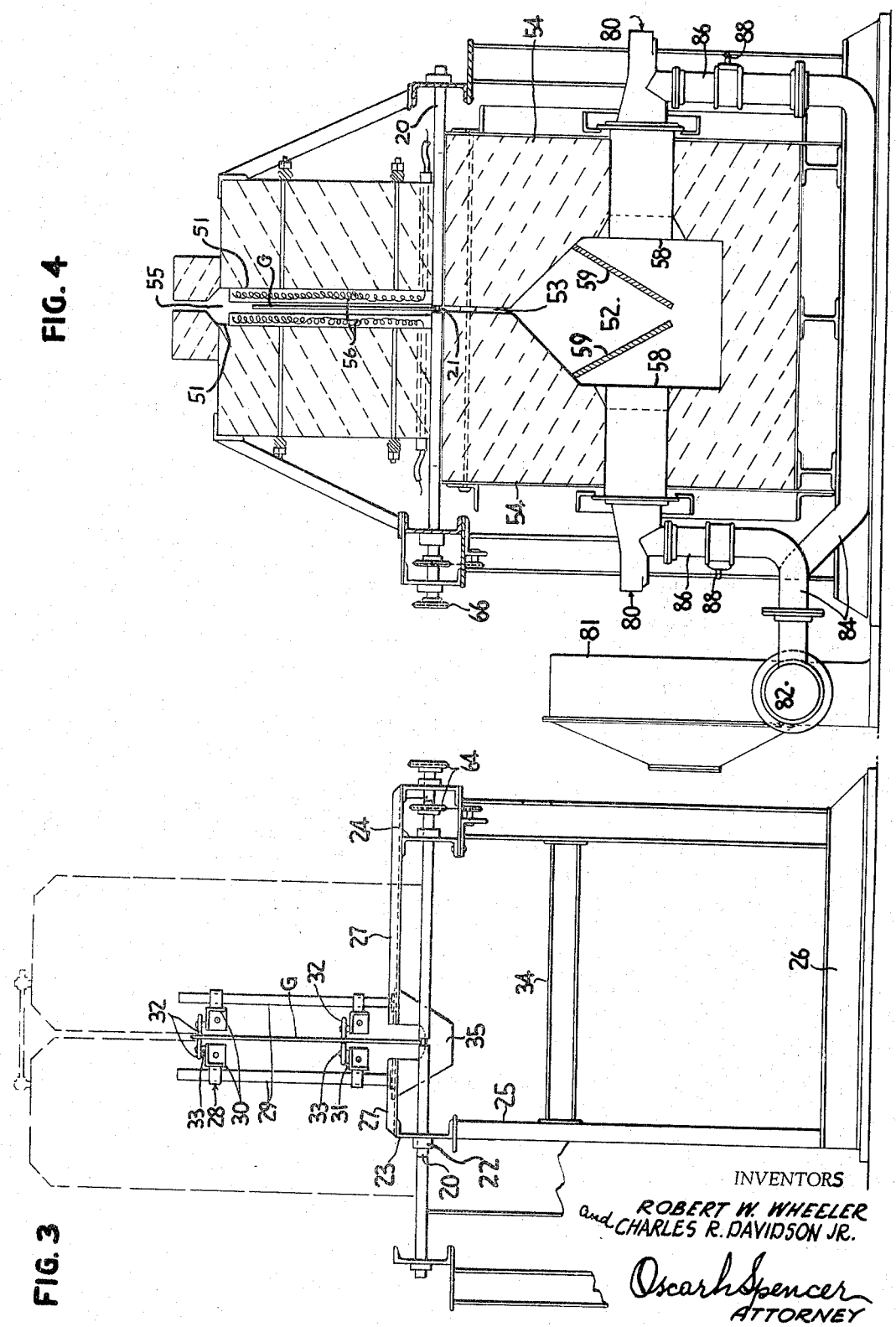

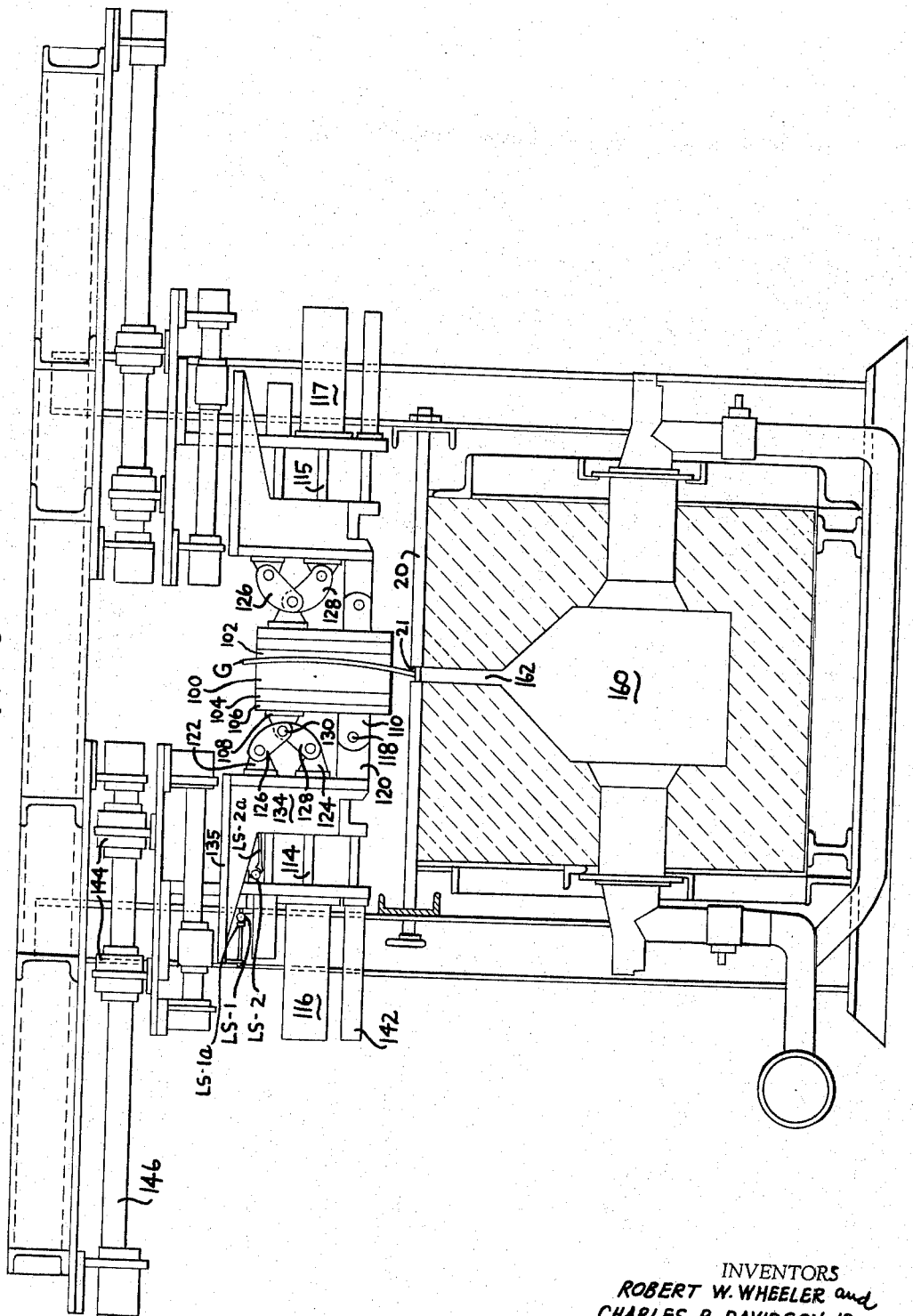

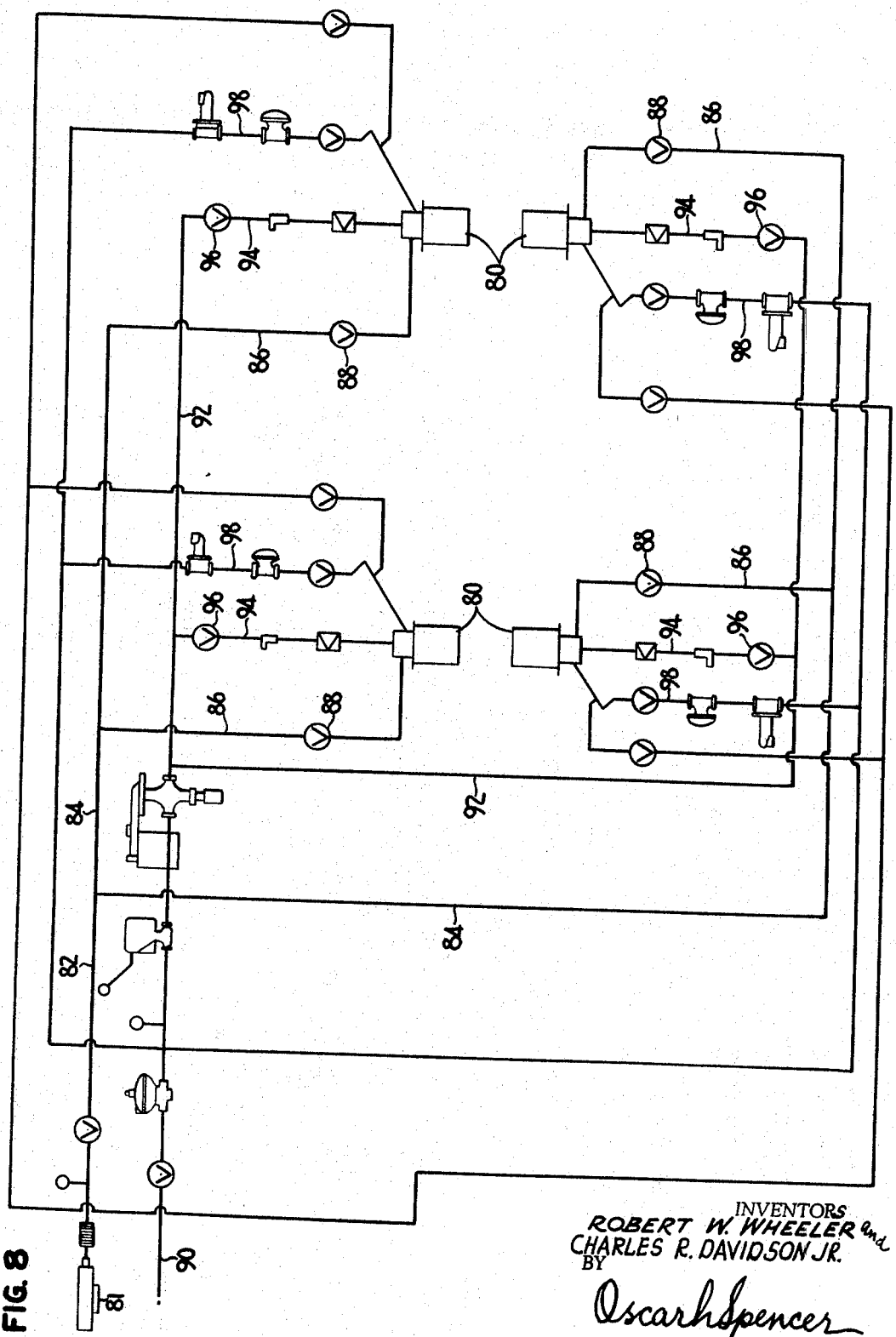

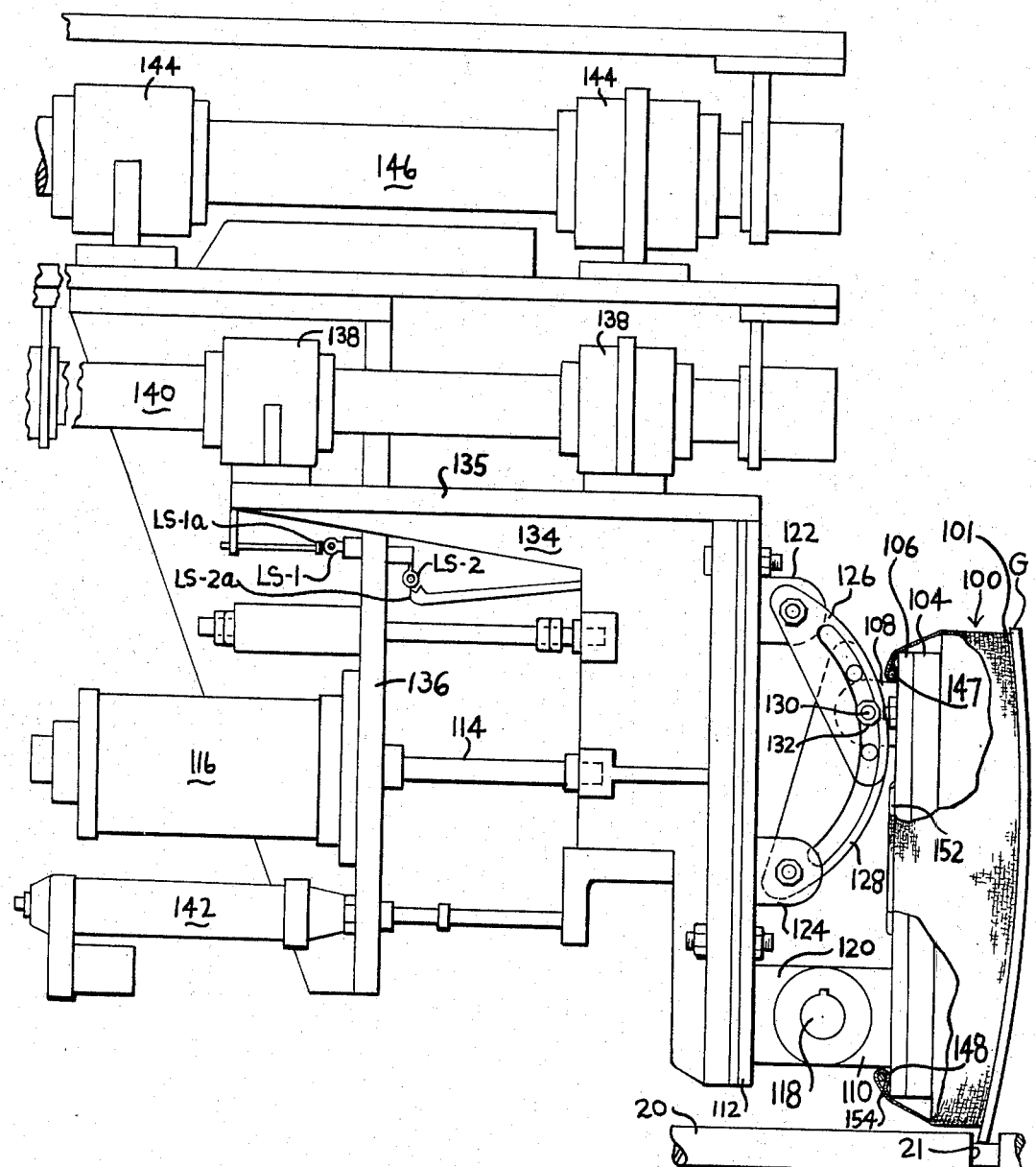

INVENTORS
ROBERT W. WHEELER and
CHARLES R. DAVIDSON JR.
BY

Oscar H. Spencer
ATTORNEY

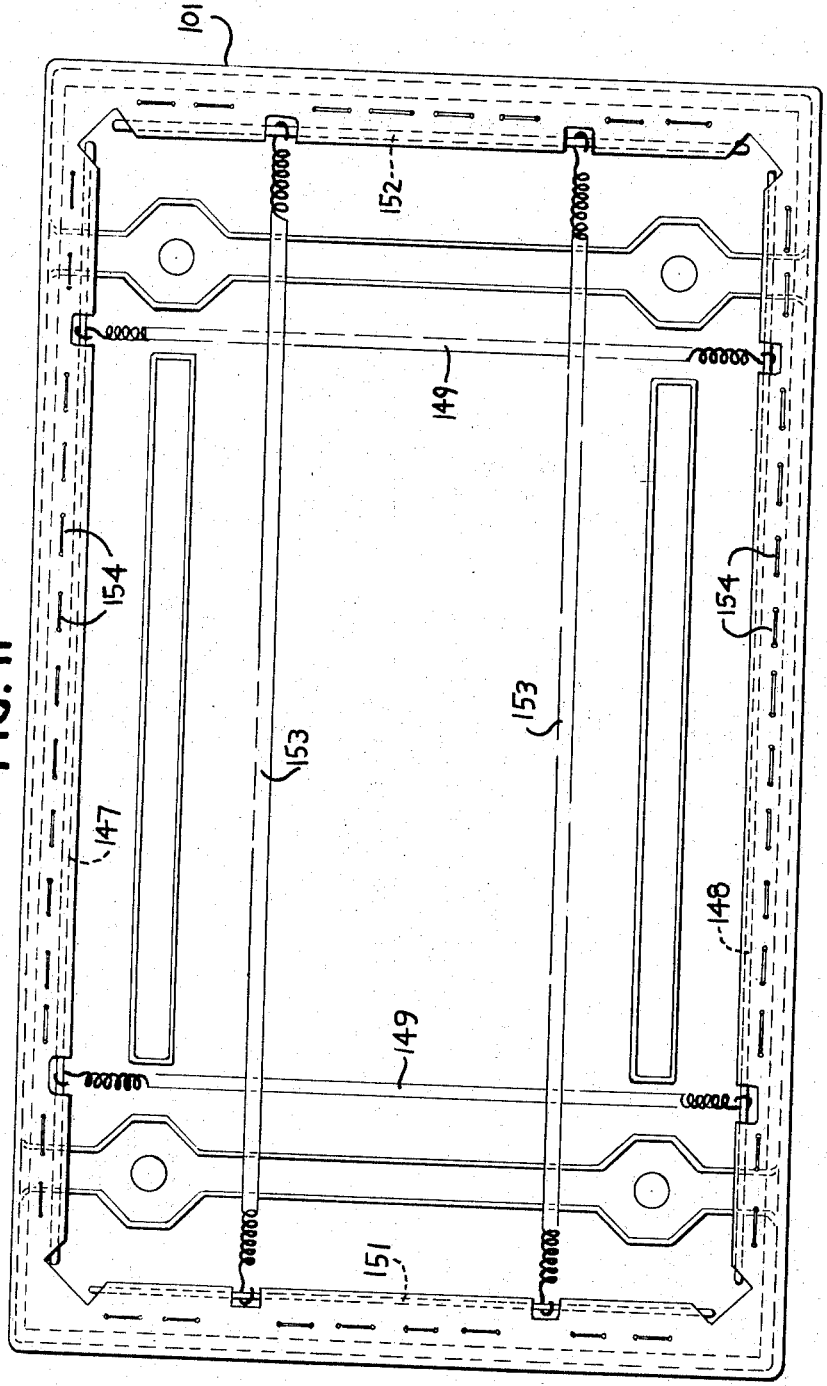

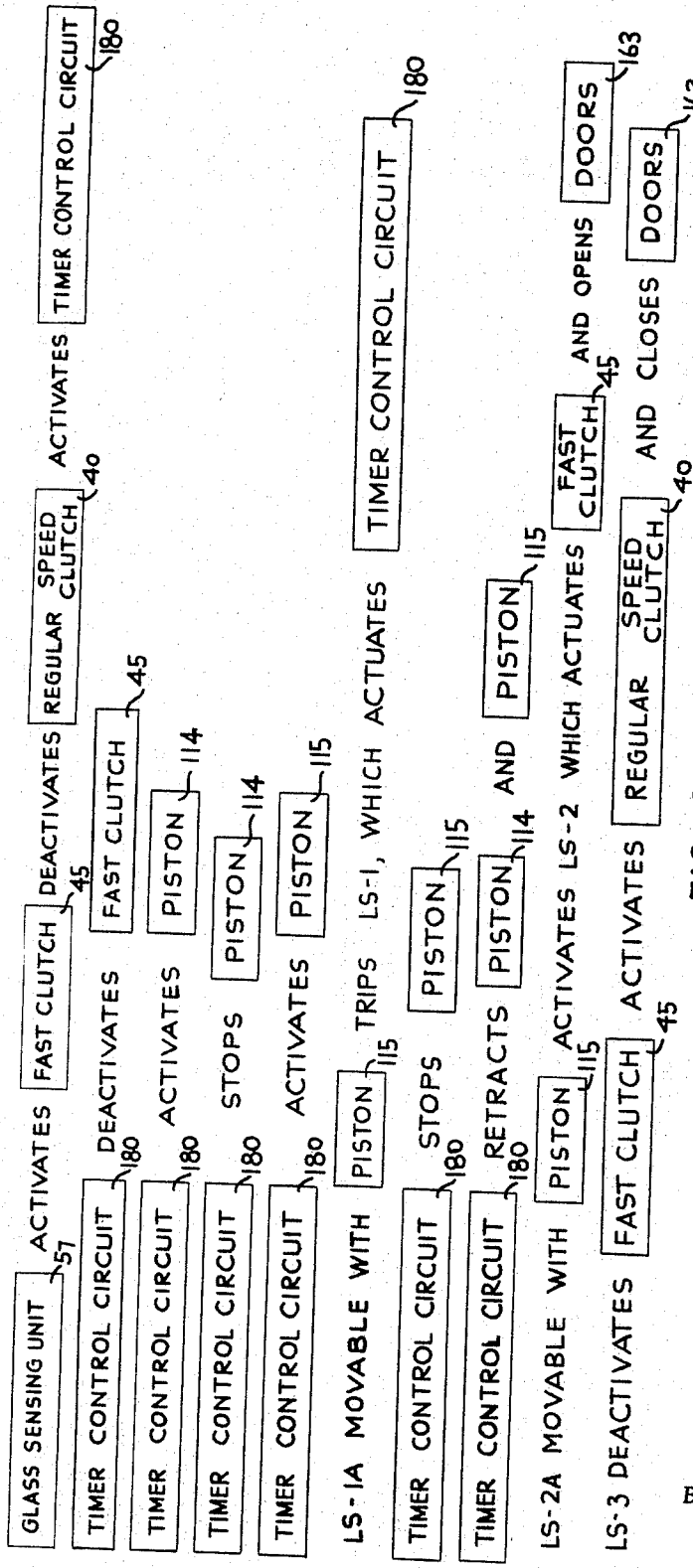

Sept. 12, 1967    R. W. WHEELER ET AL    3,341,313
METHOD AND APPARATUS FOR BENDING AND TEMPERING GLASS SHEETS
VERTICALLY SUPPORTED WITH FLUID PRESSURE
Filed Oct. 21, 1963                                         9 Sheets-Sheet 9
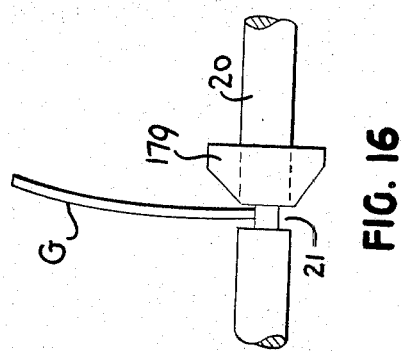
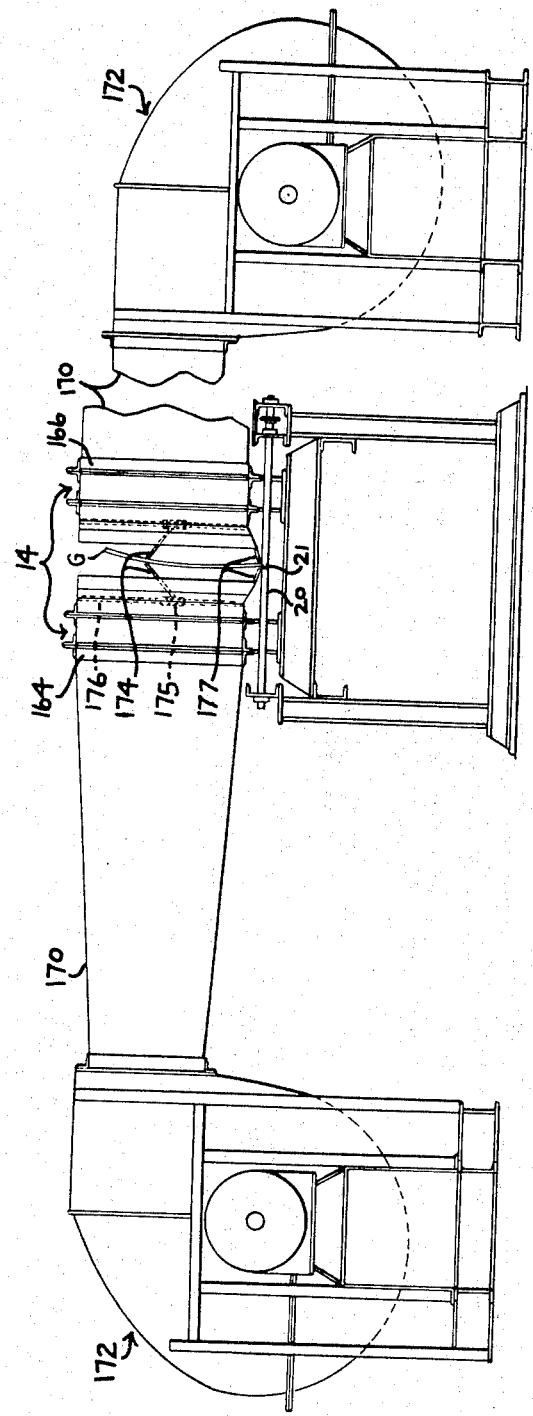
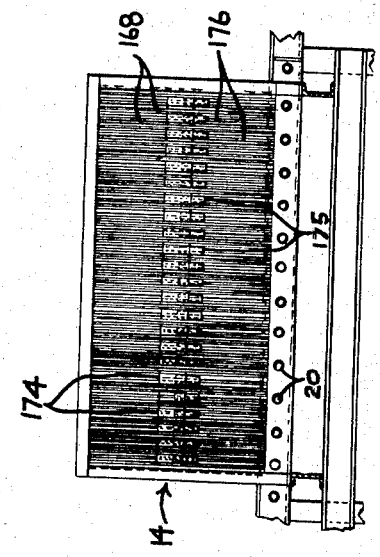
INVENTORS
ROBERT W. WHEELER &
CHARLES R. DAVIDSON JR.
BY
Chisholm and Spencer
ATTORNEYS United States Patent Office 3,341,313
Patented Sept. 12, 1967

3,341,313
METHOD AND APPARATUS FOR BENDING AND TEMPERING GLASS SHEETS VERTICALLY SUPPORTED WITH FLUID PRESSURE
Robert W. Wheeler, Pittsburgh, and Charles R. Davidson, Jr., Natrona Heights, Pa., assignors to Pittsburgh Plate Glass Company, Pittsburgh, Pa., a corporation of Pennsylvania
Filed Oct. 21, 1963, Ser. No. 317,634
19 Claims. (Cl. 65—104)

This invention relates to sheet treatment, and more particularly relates to handling glass sheets during bending and subsequent transportation of the bent glass sheets through a tempering station, although not necessarily limited to such treatment or to glass sheets.

Glass sheets have previously been bent and tempered by conveying the glass sheets through a hot atmosphere sufficient to raise the glass to a temperature above that at which the major surfaces or the contour thereof is changed by a deforming stress on contact with a solid. Hereinafter such a temperature will be referred to as the deformation temperature. For most commercial plate and window glass, this temperature is around 980 degrees Fahrenheit and above, but usually below a temperature at which the glass becomes molten.

Prior to the present invention, glass sheets were conveyed at high temperature by solid members that engaged the major surfaces of the glass sheet. This engagement resulted in undesirable deformation or marring of the major surfaces.

Recently a technique was developed for supporting and conveying hot sheets of flat glass. This development involves method and apparatus for supporting and conveying a sheet of glass in an upright position while the glass is at or above deformation temperature. According to the recent development, disclosed and claimed in application Ser. No. 212,682 of Robert W. Wheeler, filed July 26, 1962, for "Fabrication of Glass," now U.S. Patent No. 3,223,506, the flat glass sheet is physically supported at its lower edge and maintained in a substantially vertical plane by an upwardly directed flow of gas on each side of the upright sheet. This arrangement supports the glass against undesired deformation and eliminates the necessity for the major surfaces of the glass sheet to contact any solid object while the glass is at a temperature subject to thermal deformation or impairment. In this manner, the marring or distorting previously associated with flat glass fabricating processes has been eliminated during thermal treatment at and above glass deformation temperature.

The previous invention of supporting and conveying flat glass sheets on a lower edge while the major surfaces thereof are balanced in a vertical plane out of contact with solid members avoids the problem of marring the major surfaces of flat glass sheets during thermal treatment but did not suggest how to shape glass sheets so supported or how to continue to support the shaped glass sheets with their major surfaces out of contact with solid members capable of deforming the surfaces of the sheets after they had been shaped to the desired configuration.

It was necessary for the present invention to develop a technique for supporting a flat sheet vertically between a pair of shaping members having complementary contours before the shaping members engage the opposite surfaces of the flat sheet to shape the latter. In addition, it was necessary to devise a technique for supporting bent sheets between spaced vertical walls for quenching.

It is an object of the present invention to support a sheet in an upright position during shaping and other thermal treatment.

During bending of a glass sheet, for example, the sheet is supported between a pair of contoured glass shaping members, one of which has a convex shaping surface (that is, one having at least a portion protruding from its mean datum plane) and the other of which has a convex shaping surface (one having at least a portion receding from its mean datum plane). The shaping surfaces are complementary to one another. Specifically, the present invention balances the glass sheet at said glass shaping station by upward flow of hot gas between a pair of shaping members. During shaping, the pressurized engagement by the glass shaping members maintains the glass sheet in vertical balance.

After the glass is shaped to its desired configuration and before it is tempered, the present invention maintains the bent glass sheet in an upright orientation by upward flow of hot gas streams which flow between the major surfaces of the bent glass and the complementary curved shaping surfaces of the glass shaping members. In addition to supporting the shaped glass sheet in upright orientation, the hot gaseous streams retard cooling of the shaping surfaces of the shaping members and tend to equalize the heat loss throughout the glass surface during its contact and shaping by pressurized contact with the shaping members.

The bent glass sheets are maintained in upright orientation during their tempering by moving the bent glass between flat, apertured, upright walls of plenum chambers which impart opposing streams of cool air. The streams may be applied at a higher rate of flow against the convex surface of the bent glass sheet than against its concave surface.

It is particularly important that a vertical component of motion be imparted between the curved surfaces of the bent glass sheet and the flat upright walls of the apertured plenum chambers facing the curved surfaces of the bent glass sheet. The rate of cold air flow against both surfaces must be sufficiently rapid to harden the surfaces quickly and sufficiently uniform to avoid marring and distortion.

In its broader aspects, the present invention contemplates providing a conveying system adapted for handling hot bent sheets without marring or otherwise producing uncontrolled deformation in the major surfaces, even when the sheets are at deformation temperature.

In a typical operation using the present invention, flat glass sheets to be bent and tempered are disposed generally upright upon their lower horizontal edge extending in the direction of travel and are physically supported on spaced conveyor rolls which control the movement of the sheets while they are being processed. A generally upward flow of gas on each side of each sheet of glass maintains the flat glass in an upright position to prevent physical contact of its major surfaces with solid members and consequent deformation while heated to a deformation temperature sufficient for the glass to be bent and tempered.

When the glass sheet reaches the glass shaping station, it is stopped between contoured glass shaping members having complementary convex and concave shaping surfaces. A flow of gas is directed between the glass shaping members while the sheet is engaged at its lower edge to restrain the sheet from movement relative to the walls provided by the shaping surfaces. The glass sheet is thus balanced between the glass shaping members both before and after its engagement by said shaping members to deform the sheet.

The glass shaping members are then retracted and the bent glass sheet, still supported only along its bottom edge by solid members, is subjected to movement of hot gas streams along its major surfaces and moved into a tempering station wherein tempering fluid is applied under pressure from apertured flat vertical walls of plenum chambers against the major surfaces of the bent glass sheet. A greater rate of flow may be applied against the convex surface than against the concave surface. The glass sheet continues to be conveyed on spaced rollers which support the bottom edge, restrain the sheet from movement relative to the walls of the plenum chambers, and convey the glass during its tempering.

In accordance with an illustrative embodiment of apparatus conforming to the present invention, a gas supply chamber having an elongated upper slot opening provides an upward flow of gas over each major surface of the flat glass sheet within a restricted passageway formed in a tunnel-like furnace between closely spaced, vertically disposed parallel walls providing a narrow passageway for the flat glass and the flow of gas. The furnace walls support radiant heaters which irradiate the glass.

Beyond the furnace lies a glass shaping station, the curved complementary shaping surfaces of whose glass shaping members form walls of a restricted passageway for the glass sheet and the upward flow of gas from another gas supply chamber beneath said shaping station. The glass shaping members are moved into pressurized contact with a glass sheet when a glass sheet is located therebetween. The glass shaping members are retracted out of engagement with the glass sheet after it is shaped to permit the conveyor to transport the glass sheet into a tempering station located beyond the glass shaping station. Gas is supplied to the shaping station at the same or a lower temperature than to the furnace.

In the tempering station, a plenum chamber having a flat apertured inner wall is disposed on each side of the restricted passageway. A series of spaced nozzle openings or apertures are provided for the inner wall of each plenum chamber facing the restricted passageway, means are included for providing quenching fluid under superatmospheric pressure to the plenum chambers for exhaust through said series of apertures, and means are provided between said plenum chambers to impart a vertical component of motion to the quenching fluid imparted from said plenum chambers. The flow may be applied at a higher rate against the convex glass surface than against the concave glass surface to maintain the bent glass sheet in vertical balance while conveyed through the tempering station.

A plurality of conveyor rolls are horizontally aligned and located directly beneath and between the bottom portion of the vertical walls of the furnace, beneath and between the shaping members and beneath and between the restricted passageway between said plenum chambers to support the glass sheet along its bottom edge only through the furnace, shaping station and tempering station. The rolls are provided with circumferential grooves aligned along a longitudinal axis defining a path of movement for the glass sheets. The glass sheets are supported in the longitudinal grooves during their movement along the conveyor and restrained from lateral movement at their lower edge thereby.

The present invention is particularly well adapted to bend and temper glass sheets in which the thickness is small relative to the length and width. The thickness generally ranges from about ⅛ inch or less up to ½ to 1 inch. The width ranges up to about 2 to 3 feet and the length ranges upwards from 3 to 6 feet. The present apparatus can also handle smaller sheets than those specified herein.

When said sheets are supported vertically during their transport through the furnace, the heat transfer resulting from the simultaneous irradiation and hot gas flow permits the glass sheets to be heated quite rapidly to deformation temperature. The gas flow in the glass shaping station helps support the glass sheet vertically while it occupies the glass shaping station and also helps maintain a uniform surface temperature throughout the glass sheet prior to its being tempered.

In the tempering station, cold tempering fluid directed at and along the glass surfaces causes the glass to cool or quench rapidly at its surfaces while maintaining the vertical disposition of the glass. The cooling effect on each side is substantially equal despite the slightly different rates of flow needed to balance certain shapes because of the concavity of one surface and convexity of the opposite surface.

Heat transfer from the two major surfaces continues rapidly until the entire body is cooled to below its annealing range. When the glass reaches this relatively cold temperature, a permanent stress pattern or temper has been established in the glass sheet.

The advantages of the present invention will be appreciated from the following detailed description of an illustrative embodiment. In the drawings which accompany the description, and in which like reference numerals are applied to like structural elements.

FIG. 1 is a longitudinal side elevation of an illustrative embodiment of the present invention;

FIG. 2 is a fragmentary plan view partially in horizontal section of the assembly disclosed in FIG. 1 particularly emphasizing the conveyor drive system;

FIG. 3 is an end elevation along the lines III—III of FIG. 1;

FIG. 4 is a section along the lines IV—IV of FIG. 1, with parts broken away to show certain structural elements of the furnace construction;

FIG. 5 is a sectional view of the glass shaping station taken along the lines V—V of FIG. 1;

FIG. 6 is a sectionalized view of the end of the quenching station taken along the lines VI—VI of FIG. 1;

FIG. 7 is a front view of a plenum chamber of the tempering station;

FIG. 8 is a schematic diagram of air supply and gas supply lines for the burners supplying hot air-gas mixture to the furnace or the shaping station;

FIG. 9 is an enlarged detailed end view partly in section of one of the glass shaping members and its actuating means operatively connected thereto;

FIG. 11 is a rear view of the glass shaping member of FIG. 9 showing how its fiber glass cover is attached;

FIG. 12 is a chart showing the sequential operation of the moving elements and their actuating means;

Figure 10:
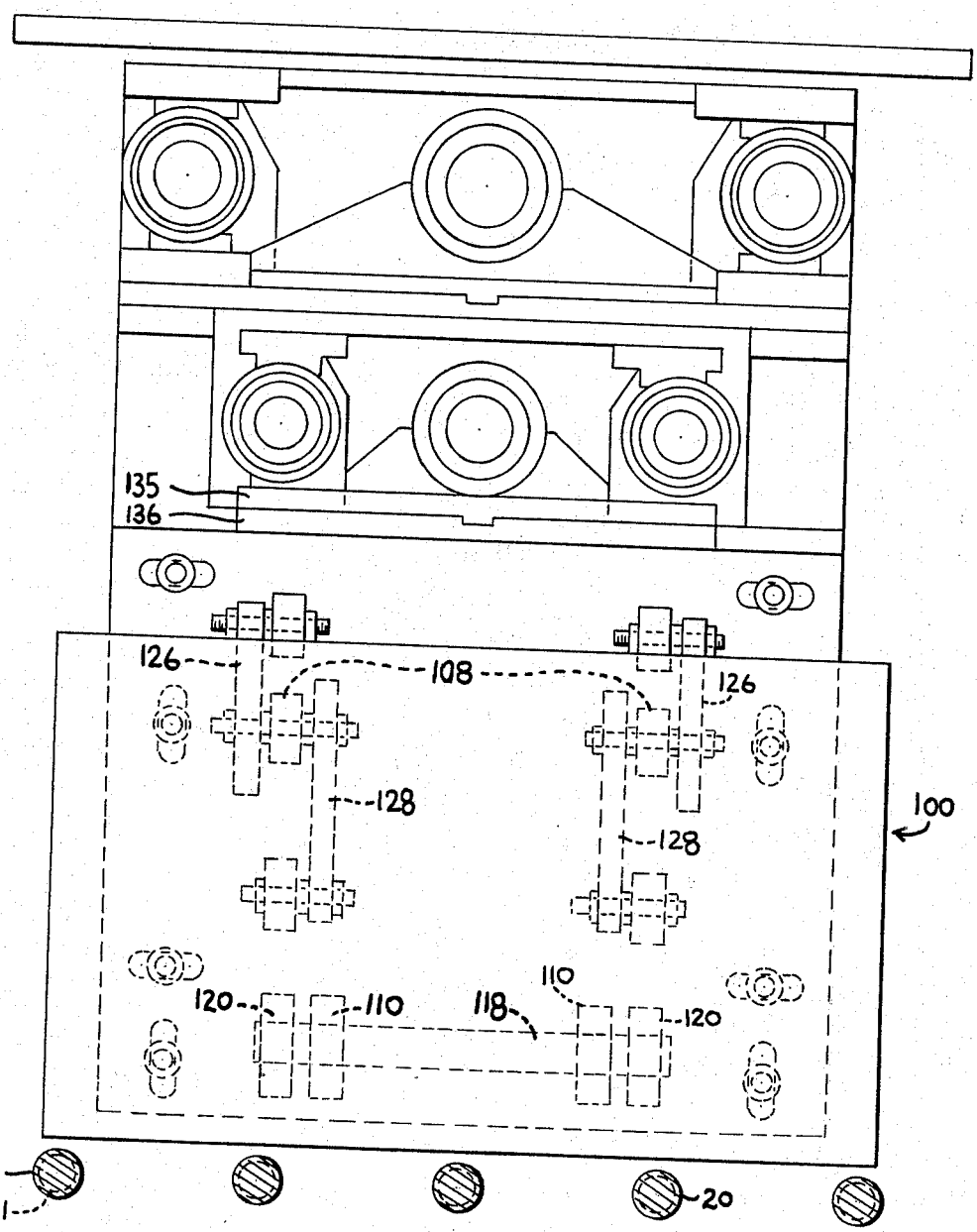
FIG. 10 is a front view of the glass shaping member of FIG. 9.

FIGS. 13, 14, and 15 are fragmentary, schematic views showing three sequential stages of a glass shaping operation; and FIG. 16 is an enlarged fragmentary view of a collar employed with the conveyor rolls in the tempering section.

Referring to the drawings, FIGS. 1 and 2 illustrate a general assembly of apparatus conforming to the present invention for heating, bending and tempering glass sheets.

The apparatus comprises a run-in section 11, a furnace 12, a glass shaping station 13, a tempering section 14, and a run-out section 15 arranged in end-to-end relation.

Run-in section 11 comprises a plurality of horizontally aligned supporting rolls 20 provided with circumferential grooves 21 aligned longitudinally with the apparatus. Rolls 20 are supported for rotation in journal blocks 22 fastened on horizontally aligned parallel channels 23 and 24 extending longitudinally of the run-in section.

Vertical posts 25 resting on horizontal I-beams 26 support the parallel channels 23 and 24. Additional reinforcing members, such as an I-beam 34 (FIG. 3), interconnect posts 25 if additional structural rigidity is desired.

Cantilever members 27 (FIGS. 1 and 3) interconnect channels 23 or 24 with one of a pair of roller support frames 28. Each roller support frame 28 comprises a pair of posts 29, an upper angle iron 30, and a lower angle iron 31, interconnecting the posts.

Free running rolls 32 are rotatably mounted on vertical stub shafts 33 supported by the upper and lower angle irons. The roller support frames 28 are symmetrically located on opposite sides of a vertical plane intersecting the grooves 21 of rolls 20. The diameter of the free running rolls 32 is identical and sufficiently less than the distance separating the vertical stub shafts 33 to provide a space therebetween to permit clearance for the thickness of the glass sheet being processed. The latter space is aligned in a vertical plane which forms a path of travel for glass sheets through the apparatus.

As shown in FIG. 3, a glass sheet G rests with its bottom edge supported in grooves 21 while it is balanced between spaced pairs of opposed free running rolls 32. The grooves 21 restrain the lower edge of the glass sheet from movement. A slotted bracket 35 interconnects the inner ends of each pair of laterally opposed cantilever members 27. The slots in the brackets 35 provide clearance for the bottom edge of glass sheets conveyed along the circumferential grooves 21 of successive rolls 20.

Additional conveyor rolls 20 circumferentially grooved at 21 form a continuation of the conveyor for supporting and propelling the bottom edge of glass sheets through the furnace section 12, the shaping station 13, the tempering station 14 and the run-out section 15 disposed in end-to-end relation beyond the exit end of the run-in section 11.

All the conveyor rolls 20 are driven by a drive motor 36 through suitable reduction gearing 37 and chain drive connections to a main chain drive 38, which directly drives the rolls 20 in the run-in section 11, the entrance portion of the furnace section 12, the exit section of the tempering section 14 and the run-out section 15. A bypassing portion 39 of the main chain drive interconnects the drive for the rolls in the run-out section 15 with those in the run-in section 11.

The remaining rolls may be selectively coupled through a clutch 40 on a shaft 41, a drive chain 42, a shaft 43, and an intermediate conveyor chain drive 44 to rotate the bypassed rolls at the exit end of the furnace section 12, the entrance end of the tempering section and throughout the glass shaping station 13 at the speed of the other conveyor rolls 20. Alternatively, the bypassed rolls may be driven at a higher speed through the intermediate chain drive 44, by engaging a clutch 45 mounted on a high speed shaft 46 coupled to the main chain drive 38 through coupling means 47 comprising stub shafts, sprockets and connecting chains which cause high speed shaft 46 to rotate at about ten times the rotational velocity of the rolls and shafts rotatably driven by the main chain drive 38.

The furnace section 12 (FIGS. 1, 2, and 4) comprises a longitudinally extending tunnel-like furnace generally indicated at 50 comprising closely spaced vertical walls 51 extending upward from the horizontal plane occupied by the conveyor rolls 20 and disposed on opposite sides of the row of the aligned grooves 21 of rolls 20.

A plenum chamber 52 (FIG. 4) is formed by suitable insulating blocks in the lower portion of the furnace beneath the conveyor rolls 20. The blocks extend the entire length of the furnace 50. Plenum chamber 52 is relatively wide in its bottom portion and tapers in width upwardly to form a narrow elongated slot opening 53 at the upper portion of plenum chamber walls 54. Slot opening 53 extends lengthwise of the furnace 50 and communicates between the plenum chamber 52 and a restricted passageway 55 for glass sheets between the furnace walls 51 above the grooved rolls 20.

Vertically arranged electrical resistance heating elements 56 are mounted in the facing surfaces of walls 51 to direct radiant energy onto the restricted passageway 55. Suitable heaters for this use are 1,000 watt electrical heating elements Model 56TS sold by the Heavy Duty Electric Company of Watertown, Wis.

The circumferential grooves 21 of the rolls 20 in the furnace 50 are aligned vertically with the elongated slot opening 53 of the plenum chamber 52 and the restricted passageway 55 between the furnace walls 51 and are centrally located with respect to the vertical passageway 55. The passageway 55 is wider than the groove.

Near the end of the furnace 50 is mounted a glass sensing unit 57 comprising an ultrasonic generator mounted on one wall 51 to generate sonic vibrations toward the other wall 51 in a direction parallel to the longitudinal axes of the rolls 20, and an ultrasonic sensing unit mounted in the opposite wall facing the generator. When the leading edge of a vertically supported glass sheet moves between the generator and the sensing unit, it trips a timing circuit that controls the operation of several elements of the apparatus, as will be described in detail later. A suitable glass sensing unit is sold under the trade name of Sonac by the ARO Corporation of Bryan, Ohio.

The plenum chamber 52 is substantially coextensive in length with the length of the furnace 50. This permits the elongated slot opening 53 to provide communication between the plenum chamber 52 and the restricted passageway 55 throughout the entire length of the furnace 50.

A plurality of burners 80 are located in spaced relation along both sides of the plenum chamber 52 to supply hot gases under pressure thereto. Alternate burners extend through passageways 58 located in staggered relation along the length of each opposite side wall 54 of the plenum chamber 52.

Baffle walls 59 extend obliquely downward and laterally inward from the sloping roof of the plenum chamber 52 to insure a turbulent flow of hot gases within the plenum chamber 52. Each baffle wall 59 extends substantially the entire length of the plenum chamber.

To supply air under pressure to the hot gas support combustion system, one or more blowers 81 (FIGS. 4 and 8) are employed to feed air under pressure through a conduit 82 to a pair of manifolds 84. As best shown in FIGS. 1 and 4, each individual burner 80 is supplied with air from a manifold 84 through a conduit 86, each provided with a valve 88.

Combustible gas from a main 90 (FIG. 8) is introduced through branch conduits 92 into each burner 80 via gas conduits 94, each individually valved as at 96.

Each burner 80 is the so-called nozzle mix, excess air heater type. Combustible gas is mixed with an excess of air within each burner and is ignited by a pilot burner supplied through a suitable pilot line 98. Burners suitable for use in apparatus described herein are preferably of the type known as North American Series 223 GXSA gas burners, manufactured by the North American Manufacturing Company of Cleveland, Ohio.

The combustion of the products in the combustion chamber of the burner supplies the plenum chamber 52 with heated gas at a uniform temperature and pressure through the passageways 58 in the plenum chamber walls 54. Adequate control of pressure and temperature is provided by correlating the rates of input of air and fuel through the furnace. An upward pressure of 1 ounce per square inch and less is sufficient to support most commercial sizes of glass sheets fabricated for automobile sidelights.

The total supply of air and fuel is enough to affect the desired support under normal conditions. The amount of fuel used is determined by the amount of heat needed to raise the glass surface temperature to the desired level. Normally an excess of air is used over that required for complete combustion of the fuel gas. The supply of excess air and fuel may be varied to change the pressure in the plenum chamber 52. A mixture of heated air and combustion products escapes upwards through the vertical passageways 55 between the furnace walls 51.

FIGS. 5, 9, 10, and 11 disclose the details of the glass shaping station 13. FIGURE 5 shows a pair of shaping members, including a convex shaping member 100 having a convex shaping surface disposed about a horizontal axis of curvature and a concave shaping member 102 having a concave shaping surface complementary to the convex shaping surface of the shaping member 100, also disposed about a horizontal axis of curvature. The shaping members are made of carbon steel or other suitable material, such as hard wood, and covered with knit fiber glass cloth covers 101.

The rear of both glass shaping members 100 and 102, as shown in FIGS. 5 and 9, are connected to an adapter plate 104 of suitable insulating material, such as Marinite (Registered Trademark).

Marinite is a registered trademark of the Johns-Manville Company and is used by them to designate a specific lime silicate bonded porous refractory composition. A representative analysis of Marinite is substantially as follows in percent by weight:

| | |
|---|---|
| $SiO_2$ | 50.64 |
| $Fe_2O_3$ (total iron) | 17.80 |
| $Al_2O_3$ | 6.28 |
| $CaO$ | 10.77 |
| $MgO$ | 4.86 |
| $Na_2O$ | 0.66 |
| $SO_3$ | 0.12 |
| Loss on ignition | 9.90 |
| Total | 101.03 |

An aluminum plate 106 having upper extension ears 108 and lower extension ears 110 is fixed to the rear of the adapter plate 104.

A mounting plate 112 is rigidly attached to the forward end of a piston 114 of an air cylinder 116. The convex shaping member 100 and its attached structure 104, 106, 108, and 110 are pivotally attached with respect to the mounting plate 112 about a pivot rod 118 carried by the lower extension ears 110 attached to the rear of the shaping member 100 and additional ears 120 attached to the mounting plate 112.

The concave glass shaping member 102 is actuated for movement by a piston 115 of an air cylinder 117. Both pistons 114 and 115 are actuated by a timer control circuit in a sequential manner to be described below.

In order to adjust the angular orientation of the shaping surface of the shaping member 100 with respect to mounting plate 112, an upper mounting block 122 and a lower mounting block 124 are rigidly attached to and extend forward of the backing plate 112. An upper scissor-like arm 126 is pivotally attached to a bearing carried by the upper mounting block 122 and an additional scissor-like arm 128 is pivotally supported by a bearing carried by the lower mounting block 124.

The scissor-like arms 126 and 128 are provided with arcuate slots at their forward ends. These arcuate slots receive a bolt 130 which extends through the upper bearing block 108. A lock nut 132 is used to tighten or loosen the bolt 130 and permit the scissor arms 126 and 128 to be pivoted about their respective pivots in the mounting blocks 122 and 124 to adjust the horizontal position of bolt 130, and, hence, the orientation of the backing plate 106 and its attached glass shaping member 100 with respect to the pivot rod 118. A similar arrangement exists for pivoting the other glass shaping member 102 with respect to its actuating piston.

A vertical gusset 134 and a horizontal plate 135 extend rearward of the backing plate 112 for supporting actuators LS–1A and LS–2A for limit switches LS–1 and LS–2, respectively. The limit switches are mounted on a vertical wall 136 of an angle member carried by the support structure for the concave glass shaping member.

The limit switches and their actuators are so located that limit switch LS–1 is actuated on inward movement of the glass shaping member 100. LS–1 actuates time-delay circuits that control the time that the glass shaping members are maintained in pressing engagement against the opposite surfaces of the glass sheet and initiate their retraction after a suitable time interval. Limit switch LS–2 is actuated when the shaping members are retracted from one another to actuate high speed clutch 45 and also to open a pair of doors 163 at the entrance of the tempering station 14 so as to insure a rapid removal of the bent glass sheet from the shaping station to the tempering station.

The horizontal plate 135 supports bearing housings 138. The bearings in said bearing housings slide along a support rod 140 whenever the glass shaping members are moved relative to one another by actuation of the air cylinders 116 and 117 causing pistons 114 and 115 to move. A suitable check valve 142, preferably a Hydro-check Model #HC–12B–142, manufactured by Bellows Manufacturing Company, is employed in conjunction with each air cylinder to insure that the movement of the shaping members toward the glass is slowed down at the last moment of inward movement.

The support structure for the movable glass shaping members including the slide rod 140 is in turn supported in sliding relation by sleeve bearings 144 on a support rod 146 to enable the entire assembly to be retracted a sufficient distance to replace the glass shaping members whenever a production change requires such change in said shaping members.

The knit fiberglass cloth covers 101 of the glass shaping members 100 and 102 are tightly mounted against the shaping surfaces and are lapped to the rear of the aluminum backing plate 106. As best seen in FIG. 11, the upper edge of the cover is lapped about an upper horizontal rod 147 and the lower edge of the cover member lapped about a lower horizontal rod 148. Springs 149 interconnect rods 147 and 148 to provide means for maintaining the vertical dimension of the fiberglass cover of the shaping member in unwrinkled condition against the shaping surfaces of the glass shaping member. The side edges of the cover member are lapped about additional vertical rods 151 and 152 interconnected by horizontal springs 153 to maintain the horizontal dimension of the fiberglass cloth cover unwrinkled against the shaping surface of the shaping member.

Each of the four sides of a fiberglass cover is lapped over one of the rods 147, 148, 151, or 152. The lapped portion is attached to the rods by staples 154. The rods are positioned to the rear of the backing plate and interconnected by the springs 149 and 153 as shown in FIG. 11.

The glass shaping station 13 also comprises a pair of closely spaced flat vertical walls 157 extending from the end of the furnace to adjacent the position occupied by the glass shaping members 100 and 102. The flat vertical walls 157 enclose an extension of the restricted passageway 55 for the furnace section 12. Curved walls 158 extend beyond the glass shaping members 100 and 102 toward the tempering station 14. The space between the curved walls 158 is aligned with the restricted passageway 55 so as to provide a further extension of a restricted passageway for transporting the glass sheets after they are shaped. Walls 158 are shaped similar to the shaping members 100 and 102 and comprise a convexly shaped wall spaced from a concavely shaped wall.

An additional plenum chamber 160 constructed in a manner similar to plenum chamber 52 lies under the glass shaping station 13. An upper elongated slot opening 162 at the top of additional plenum chamber 160 is aligned with the circumferential grooves 21 of the conveyor rolls 20 within the glass shaping station. The glass shaping members 100 and 102 are so arranged that in the closed position the lowermost portion of the shaping surfaces are aligned in the same vertical plane as the elongated slot opening 162 above the lower plenum chamber 160.

A system of burners and air blowers similar to that provided for the plenum chamber 52 beneath furnace 50 is supplied for the plenum chamber 160 beneath glass shaping station 13. Hence, their details are not repeated in this portion of the description.

The tempering station 14 is best understood from FIGS. 1, 6, 7, and 16 and extends in end-to-end relation beyond the glass shaping station 13. A pair of doors 163 actuated by motors (not shown) normally separates the tempering station 14 from the glass shaping station 13.

Plenum chambers 164 and 166 are rigidly supported along the length of the tempering station 14. The plenum chambers are located on each side of the vertical plane of travel for the glass being conveyed.

Each plenum chamber has spaced, opposed, slotted openings 168 disposed in flat vertical walls spaced from one another along the direction of glass travel. The slotted openings 118 are horizontally spaced from one another along the direction of glass travel. These slots extend the entire vertical height of the conveying path. The space between the slots forms an additional extension of the restricted passageway 55 and the space between the flat walls 157, the glass shaping members 100 and 102 and the curved walls 158.

Conduits 170 supply the plenum chambers 164 and 166 with cold air from blowers 172. This cold air is supplied at a suitable rate of flow and pressure to temper the bent glass sheet passing through the tempering station 14 between the opposed openings 168.

In order to provide a vertical component of air flow sufficient to maintain the glass sheets in a fixed vertical position and to enable the air blasts heated upon contact with the glass to escape, oblique baffles 174 extend inward and upward from sleeves 175 adjustably secured to vertical posts 176. Each of the latter is attached to a plenum chamber reinforcement (not shown) between adjacent vertical slots 168.

The oblique baffles 174 are located intermediate the upper and lower extremities of the plenum chambers. In addition, additional baffles 177 extend inward from the bottom of the slot openings 168 between the latter to restrict the bottom opening of the passage through the tempering station 14.

The top of the passage between the plenum chambers is open to permit ready escape of heated air after it has been heated upon contact with the glass sheet. The combination of structural elements recited above promotes an upward component of air flow in the tempering station 14 along the opposite surfaces of the vertically oriented bent glass sheets conveyed through the tempering station.

With special reference to FIG. 16, a special collar 179 of truncated conical shape is mounted on each conveyor roll 20 in the tempering section 14. The collars 179 are located adjacent each slot 21. The radius of the collar is smallest adjacent the slot and increases axially of the attached roll 20 in the direction of the side occupied by the convex shaping member. The collars 179 cooperate with the grooves 21 to restrain movement of the lower edge of the curved glass sheet. The collars 179 are needed in the case where glass sheets are bent about their vertical as well as their horizontal axes.

A limit switch LS-3 is positioned inward of the leading edge of the tempering station 14 for actuation by the leading edge of a glass sheet to simultaneously deactivate the high-speed clutch 45 and activate clutch 40 so as to permit the intermediate portion of the conveyor to propel glass sheets forwardly at the regular conveyor speed provided by the main conveyor chain drive 38. Limit switch LS-3 also closes the doors 163 at the entrance to the tempering station 14.

FIG. 12 shows a program of the operation of the controls for the various moving elements of the conveyor and the shaping members. When a flat glass sheet is disposed between the transmitter and sensor of the glass sensing unit 57 in the furnace 50, a timer control circuit 180 immediately actuates the fast clutch 45 and deactivates the regular speed clutch 40. The timer control circuit 180 also controls the opening of doors 163 for the time interval needed to remove a glass sheet that has just been shaped from the glass shaping station 13 to the tempering station 14. The bent glass sheet is immediately ahead of the flat sheet whose presence was sensed by the glass sensing unit 57.

After a predetermined time determined by how long it takes the flat glass sheet to reach a position of alignment between the glass shaping members, the timer control circuit deactivates the fast clutch 45. The regular speed clutch remains deactivated so that the glass sheet is stopped between the glass shaping members.

At that time, the timer control circuit actuates the pistons 114 and 115 to cause the glass shaping members to move toward one another in a desired sequential arrangement. A preferred sequence of operations is shown in FIGS. 13 to 15.

Initially, as shown in FIG. 13, the flat glass sheet G is spaced about 1/8 inch to 3/16 inch from the convex shaping member 100. The concave shaping member 102 moves inward into contact with one surface of the flat glass sheet while the convex shaping member 100 remains in spaced relation, as depicted in FIG. 14. Then, the convex shaping member 100 is brought into pressurized contact with the glass sheet, preferably at a pressure of about 1 pound per square inch. Gas is flowed upward continuously from plenum chamber 160 during the shaping operation. The pressing position of the glass shaping members is shown in FIG. 15.

As one of the glass shaping members moves toward the glass sheet, it actuates limit switch LS-1. This limit switch initiates a timing circuit which determines the stopping and the holding of the glass shaping members with a glass sheet sandwiched between and determines the period at which the glass shaping members are retracted from pressurized contact with the glass.

As the glass shaping member retracts, it actuates limit switch LS-2, causing a relay in a relay control 182 to energize the fast clutch 45 and opens the doors 163. This causes the bent glass sheet to be moved from the glass shaping station 13 into the glass tempering station 14 at a high speed.

When the leading edge of the glass sheet contacts limit switch LS-3, the latter closes the doors 163, deactivates the fast clutch 45 and reactivates the regular speed clutch 40. When the next glass sheet to be treated reaches the position of alignment between the transmitter and the sensor of the glass sensing unit 57, the cycle is repeated.

The following are examples, by way of illustration only, of preferred modes of operating the invention disclosed herein as applied to the bending and tempering of automobile sidelights having a cylindrical shape and 3/16 inch thick, 18 inches high, 23 inches long, bent to a uniform radius of curvature of 60 inches disposed horizontally.

Glass sheets were loaded onto the run-in section 11 and disposed in proper vertical alignment upon the grooves 21 of the rolls 20 by engaging the upper portions between rollers 32. In this manner, glass sheets were conveyed seriatim into the furnace 50 where their movement was continued while supported on the circumferential grooves 21 of the additional rolls.

The temperature of the heating coils 56 was maintained at a temperature of 1350 degrees Fahrenheit, except for the two sets of elements at the entrance and exit ends of the furnace, which were maintained at 1200 degrees Fahrenheit. The temperature of the gases within the plenum chamber was maintained between 1240 and 1250 degrees.

The gas was furnished at a rate of 72 cubic feet per hour at standard flow per foot length of the furnace. The normal operating ratio of air to gas was 45 to 1 for the mixture supplied to the furnace.

Glass sheets were conveyed through a 6 foot long furnace in about 3 minutes. During this time, the glass sheets reached a surface temperature of 1220 degrees Fahrenheit.

The high-speed conveyor sections transferred the glass from the furnace to the tempering station at a speed of 240 feet per minute. The retracted convex shaping member was maintained between 1/8 and 1/4 inch from the glass surface to provide a Venturi effect for the hot gases applied upward from the plenum chamber 160 disposed below the shaping members. The temperature within the additional plenum chamber was maintained between 760 and 800 degrees Fahrenheit. The gas was supplied in the additional plenum chamber at a rate of 108 cubic feet per hour per foot length of shaping station and a normal operating ratio of air to gas of 70 to 1 to provide the proper supply of gaseous mixture in this station.

The pressure applied to shape the glass was about 1 pound per square inch.

In the tempering station, air at room temperature was supplied at 7 ounces per square inch plenum pressure against the convex surface and 6 ounces per square inch plenum pressure against the concave surface. The nozzles were of uniform width top to bottom, 3/16 inch wide and spaced 3 inches center to center. The high speed conveyor moved the glass at 10 times the speed of the regular conveyor.

The rate of air and fuel flow is dependent upon furnace length and independent of the height or vertical dimension of the glass sheet treated, up to glass sheets having a height of about 3 feet.

In the tempering station, air was supplied through the nozzle orifices at a rate of about 560 cubic feet per minute per square foot of area against the convex side of the bent glass sheet and about 480 cubic feet per minute per square foot of area against the concave surface. As the glass travelled through the tempering station, the surface temperature was lowered through the annealing range in less than 2 seconds. By the time the glass reached the run-out section 15, which is the mirror image of the run-in section 11, the glass was sufficiently below deformation temperature to permit its contact with solid elements at its major surfaces.

Glass sheets bent and tempered according to the method and using the apparatus described hereinabove had a stress, in terms of the center tension thereof indicated by a birefringent effect of the glass on polarized light waves, of approximately 3200 millimicrons per inch of glass length as measured by standard techniques using a polariscope.

The walls 51 within the furnace 50, the flat walls 157 and the curved walls 158 of the glass shaping station 13 and the inner slot openings 168 of the tempering station 14 were spaced on opposite sides of the path of movement of the glass with about 3/4 inch space between the opposing walls for treating glass sheets 3/16 inch thick.

A typical embodiment of the present invention has been described hereinabove. It should be evident from the foregoing disclosure that numerous modifications or alterations may be made without departing from the spirit and scope of the invention as set forth in the claimed subject matter which follows. Such modifications include supporting the bottom edge of the glass on carriers or a flexible belt or chain instead of spaced rolls. Other modifications include the combination of a different type of support for the flat glass during its heating prior to its being supported in the manner depicted above during bending and tempering.

For example, the glass sheet may be supported horizontally while conveyed on spaced horizontal rollers or on a fluid bed during its heating and pivoted or otherwise transferred into a vertical position prior to its shaping, or the glass sheet may be gripped by tongs until its temperature reaches the deformation point, at or before which time the glass sheet may be transferred to the bottom edge support disclosed hereinabove for the completion of its heating and for its shaping and tempering. It is also understood that the present invention is suitable for bending sheets other than glass and is also suitable for bending sheets of glass or other material about two axes angularly disposed relative to one another as well as about a horizontal axis of bending described above.

What is claimed is:

1. A method of press bending a plastic sheet which comprises supporting said sheet in an upright position, pressing said sheet between a pair of contoured shaping members, one of which has a protruding portion and the other of which has a receding portion corresponding to the protruding portion of said one shaping member, moving the shape members away from said sheet while directing a fluid in a direction along its major surfaces between said sheet and said shaping members at a pressure sufficient to balance said sheet in said upright position and continuing to direct fluid along said major surfaces until said surfaces become more resistant to deformation.

2. A method as in claim 1 wherein said fluid is a gaseous fluid.

3. A method as in claim 1 wherein said sheet is engaged at its edge surface adjacent an origin of said fluid.

4. In the art of bending a heat-softened flat glass sheet, the improvement comprising supporting said flat glass sheet with one edge surface at a higher elevation than that of an edge surface opposite said one edge surface upon said opposite edge surface thereof between a pair of spaced glass shaping members having complementary convex and concave shaping surfaces, directing fluid upward between said spaced glass sheet and said shaping members in a direction transverse to said edge surface at a pressure sufficient to balance said sheet in an upright position while moving said shaping members toward the opposite major surfaces of said glass sheet, and engaging the opposite major surfaces of said heat-softened glass sheet in pressurized engagement between said shaping members while so supported until said sheet conforms to the curvature of said shaping surfaces.

5. In the art of bending a heat-softened flat glass sheet, the improvement comprising supporting said flat glass sheet upon a lower edge surface thereof between a pair of glass shaping members having complementary convex and concave shaping surfaces, directing fluid in a direction transverse to said edge surface at a pressure sufficient to balance said sheet in an upright position between said glass sheet and said shaping members while moving said shaping members toward the opposite major surfaces of said glass sheet, contacting one major surface of the glass sheet with the concave shaping surface while the convex shaping surface is spaced from the glass sheet, then moving the convex shaping surface into engagement with the other major surface of said heat-softened glass sheet until said heat-softened glass sheet is shaped to conform to said shaping surfaces.

6. In a method of bending and tempering a heat-softened glass sheet comprising supporting said flat glass sheet upon a lower edge thereof, flowing fluid adjacent the major surfaces of said glass sheet at a rate sufficient to balance said glass sheet in a substantially upright orientation while supporting said glass sheet upon a lower edge thereof in alignment between a pair of glass shaping members having complementary shaping surfaces while said glass sheet is at its deformation temperature, engaging the opposite major surfaces of said oriented glass sheet in pressurized contact between said glass shaping members to shape said glass sheet into conformity with said glass shaping surfaces, disengaging said glass sheet from pressurized contact between said glass shaping members while continuing to flow fluid adjacent each said major surface at a rate sufficient to maintain said glass sheet in a substantially upright orientation and conveying said sheet supported along said lower edge in a horizontal edgewise direction while flowing cold fluid adjacent each major surface of said glass sheet at a rate sufficient to impact a temper thereto and to balance said glass sheet in said vertical orientation.

7. A method as in claim 6 wherein said glass sheet is shaped to have a convex surface and a concave surface during said pressurized engagement and said cold fluid is applied against said convex surface at a greater rate of flow than against said concave surface.

8. A method of bending and tempering a glass sheet comprising supporting said flat glass sheet upon a lower edge thereof, conveying said sheet through a hot atmosphere while so supported in a horizontal edgewise direction for sufficient time to heat the glass sheet to its deformation temperature, flowing hot fluid parallel to the major surfaces of said glass at a rate sufficient to balance said glass sheet in a substantially upright orientation while conveyed through said atmosphere, bringing said glass sheet into alignment with a pair of glass shaping members having complementary shaping surfaces while said glass sheet is at its deformation temperature, engaging the opposite major surfaces of said oriented glass sheet in pressurized contact between said glass shaping members to shape said glass sheet into conformity with said glass shaping surfaces, disengaging said glass sheet from pressurized contact between said glass shaping members while continuing to flow fluid adjacent each said major surface at a rate sufficient to maintain said glass sheet in a substantially upright orientation and conveying said sheet supported only along said lower edge in a horizontal edgewise direction while flowing cold fluid adjacent each major surface of said glass sheet at a rate sufficient to impart a temper thereto and to balance said glass sheet in said upright orientation.

9. A method as in claim 8, wherein said glass sheet is shaped to have a convex surface and a concave surface during said pressurized engagement and said cold fluid is applied against said convex surface at a greater rate of flow than against said concave surface.

10. Apparatus for bending a glass sheet comprising a longitudinally extending tunnel-like furnace having spaced side walls on opposite sides of its longitudinal axis, a glass shaping station in end-to-end relation with said furnace and having glass shaping members movable between a closed position and a retracted position spaced on opposite sides of said longitudinal axis, a longitudinally extending glass tempering station in end-to-end relation with said glass shaping station, and having means for applying quenching fluid under pressure from opposite sides of said longitudinal axis, conveyor means extending longitudinally through said furnace, said glass shaping station and said glass tempering station, said conveyor means comprising a series of transversely extending conveyor rolls longitudinally spaced from one another, each conveyor roll being provided with a circumferential groove, said circumferential grooves being aligned along said longitudinal axis for supporting said glass sheet along its bottom edge, means to rotate said conveyor rolls in unison to convey said glass sheet along the length of said conveyor means, glass sheet heating means disposed along said conveyor comprising an elongated chamber below said conveyor, said elongated chamber having at its uppermost portion a slot opening of a width slightly greater than that of said elongated grooves in vertical alignment with said elongated grooves, means for introducing hot gas under superatmospheric pressure into said elongated chamber and for causing said hot gas to flow upward through said slot opening between the side walls of said furnace and between the shaping surfaces of said glass shaping members when retracted, said glass tempering station comprising a plenum chamber on each side of said longitudinal axis, spaced nozzle openings for each chamber providing a series of apertures for each chamber facing a vertical plane occupied by said longitudinal axis, means for providing quenching fluid under superatmospheric pressure to said plenum chambers for exhaust through said series of apertures, means between said plenum chambers to impart a vertical component of motion to said quenching fluid, and means operatively connected to said glass shaping members to move said glass shaping members into pressurized contact with said glass sheet when located therebetween and to retract said glass shaping members out of engagement with said glass sheet to permit said conveyor to transport said glass sheet into said tempering station.

11. A method of conveying a free standing discrete sheet in a substantially upright orientation which comprises disposing said sheet with an edge surface on a support between a pair of closely adjacent upwardly extending walls that converge in a direction away from said support so that there is gradually decreasing distance between the walls and the major surfaces of said sheet, and directing fluid between the walls and the major surfaces of said sheet in the direction of said decreasing distance at a rate of fluid flow sufficient to balance said sheet in substantially said upright orientation in spaced relation between said walls and to provide an increased fluid pressure resulting from said rate of fluid flow at a region of maximum convergence between said walls in spaced relation to said support, and moving said sheet through said directed fluid while so supported and balanced.

12. A method of heat treating a free standing discrete sheet in a substantially upright orientation which comprises disposing said sheet with an edge surface on a support between a pair of closely adjacent upwardly extending walls that converge in a direction away from said support so that there is gradually decreasing distance between the walls and the major surfaces of said sheet, and directing fluid between the walls and the major surfaces of said sheet in the direction of said decreasing distance at a rate of fluid flow sufficient to balance said sheet in substantially said upright orientation in spaced relation between said walls and to provide an increased fluid pressure resulting from said rate of fluid flow at a region of maximum convergence between said walls in spaced relation to said support, wherein said fluid is applied at a temperature different from that of said sheet to provide said thermal treatment.

13. A method of supporting a glass sheet in a substantially upright orientation preparatory to press bending said sheet comprising supporting said sheet on a lower edge surface thereof between a pair of shaping members having complementary shaping surfaces that conform to the shape desired for the glass sheet after bending, directing fluid upward between both major surfaces of said glass sheet and said complementary shaping surfaces in a direction transverse to said edge surface at a pressure sufficient to balance said sheet in said substantially upright orientation, moving said shaping members toward the opposite major surfaces of said glass sheet while continuing to direct said fluid in said direction until said shaping surfaces come into pressurized engagement against the opposite major surfaces of said glass sheet to bend said sheet into a desired shape.

14. In combination with the method of claim 13, the additional step of removing said shaping members from pressurized engagement against the opposite major surfaces of said bent glass sheet and directing said fluid in said direction at a pressure sufficient to balance said curved sheet intermediate said shaping members in said substantially upright orientation.

15. A method of tempering a bent sheet of glass supported in a substantially upright orientation at a deformation temperature, said sheet having a concave surface and an opposite convex surface, which comprises directing flows of cold fluid against said opposite surfaces at a flow rate sufficient to temper said sheet while supporting said bent sheet on an edge surface and applying a sufficiently greater flow of said fluid against said convex surface than against said concave surface to produce balancing force against concave and convex surfaces to maintain said sheet in said substantially upright orientation until said sheet is cooled to below its strain point.

16. A method of conveying a bent sheet of glass having a concave surface and an opposite convex surface while supported in a substantially upright orientation, said surfaces being curved about a horizontal axis of bending comprising directing flows of fluid against said opposite surfaces while supporting said bent sheet on an edge surface, conveying said sheet through said directed fluid in a direction parallel to said axis of bending, and applying a sufficiently greater flow of fluid against said convex surface than against said concave surface to produce balancing force against said concave and convex surfaces to maintain said curved sheet in a substantially upright orientation while said sheet is so conveyed.

17. A method of bending and tempering glass sheets as they are moved along a predetermined path through successive heating, bending and chilling areas, said sheets being supported along the lower edges thereof free from gripping by tongs on heated gas during movement through said heating area by applying hot gas against the major surfaces thereof at a pressure sufficient to support said sheets and to heat said sheets to a deformation temperature and on relatively cool gas during movement through said chilling area by applying cold gas against said major surfaces at a pressure sufficient to support said sheets and to reduce the temperature of the sheets sufficiently rapidly to temper the glass, interrupting the forward movement of each of the sheets in said bending area when said sheet is aligned between spaced complemental shaping surfaces and, while supporting said sheets along said lower edges between said complemental shaping surfaces free from gripping by tongs, pressing said sheets into the desired curvature between said complemental shaping surfaces before passing them into the chilling area.

18. A method of bending and tempering glass sheets as claimed in claim 17, wherein the glass sheets are supported on edge in a substantially vertical plane as they are moved along said predetermined path.

19. Apparatus for bending and tempering glass sheets, including a conveyor for moving a sheet along a predetermined path successively through heating, bending and chilling areas, means for directing heated gas along each major surface of the glass sheet during movement thereof through said heating area at a pressure sufficient to support said sheet on edge on said conveyor, and means for directing cooling gas against said surfaces of said sheet during movement thereof through said chilling area at a pressure sufficient to support the sheet on edge on said conveyor, means in said bending area for bending said sheet to the desired curvature comprising mold parts mounted at opposite sides of said predetermined path and having complemental shaping surfaces formed thereon, means for supporting said sheet along its lower edge in position between said mold parts while said sheet is free from gripping by tongs immediately before and immediately after said bending means engages said sheet, and means for moving said mold parts relative to one another toward and away from said path to press said sheet between said shaping surfaces into the curvature defined by said shaping surfaces.

References Cited

UNITED STATES PATENTS

| | | | |
|---|---|---|---|
| 2,395,727 | 2/1946 | Devol | 65—182 X |
| 2,476,169 | 7/1949 | White et al. | 65—273 X |
| 3,048,383 | 8/1962 | Champlin | 65—182 X |
| 3,062,520 | 11/1962 | Frey et al. | |
| 3,223,506 | 12/1965 | Wheeler | 65—273 X |

DONALL H. SYLVESTER, *Primary Examiner.*

A. D. KELLOGG, *Assistant Examiner.*